(12) United States Patent
Yi et al.

(10) Patent No.: US 11,669,622 B2
(45) Date of Patent: Jun. 6, 2023

(54) METHOD AND APPARATUS FOR PROVIDING VISIBILITY OF SECURITY INTO CONTAINER IMAGES

(71) Applicant: ELECTRONICS AND TELECOMMUNICATIONS RESEARCH INSTITUTE, Daejeon (KR)

(72) Inventors: Hyunyi Yi, Daejeon (KR); Sung-Jin Kim, Daejeon (KR); Chulwoo Lee, Daejeon (KR); Woomin Hwang, Daejeon (KR); Byungjoon Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 238 days.

(21) Appl. No.: 16/991,362

(22) Filed: Aug. 12, 2020

(65) Prior Publication Data
US 2021/0382997 A1 Dec. 9, 2021

(30) Foreign Application Priority Data

Jun. 8, 2020 (KR) .................. 10-2020-0069082

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC ............. G06F 21/577; G06F 2221/033; G06F 9/45504; G06F 21/52
See application file for complete search history.

(56) References Cited

U.S. PATENT DOCUMENTS

| | | | |
|---|---|---|---|
| 9,830,308 B2 | 11/2017 | Kim | |
| 10,333,981 B2 | 6/2019 | Lee et al. | |
| 10,528,337 B1* | 1/2020 | Varadharajan Kannan | ................. G06F 8/71 |
| 11,062,022 B1* | 7/2021 | Kalamkar | ........... G06F 9/45558 |
| 2017/0187540 A1* | 6/2017 | Stopel | ..................... G06F 21/33 |
| 2019/0121986 A1* | 4/2019 | Stopel | ................. G06F 21/577 |
| 2020/0082095 A1 | 3/2020 | Mcallister et al. | |
| 2020/0097662 A1* | 3/2020 | Hufsmith | .............. H04L 9/0643 |
| 2020/0364039 A1* | 11/2020 | Gibbs | ....................... G06F 8/71 |

FOREIGN PATENT DOCUMENTS

| | | |
|---|---|---|
| KR | 10-2015-0081638 A | 7/2015 |
| KR | 10-2017-0022028 A | 3/2017 |

* cited by examiner

*Primary Examiner* — Meng Li
(74) *Attorney, Agent, or Firm* — LRK Patent Law Firm

(57) ABSTRACT

A method and apparatus for providing security visibility into a container image. The method includes generating a software list by analyzing layers forming a container image, generating a vulnerability check result based on the software list, and generating a container image content report based on the software list and the vulnerability check result.

12 Claims, 10 Drawing Sheets

METHOD AND APPARATUS FOR PROVIDING VISIBILITY OF SECURITY INTO CONTAINER IMAGES

CROSS REFERENCE TO RELATED APPLICATION

This application claims the benefit of Korean Patent Application No. 10-2020-0069082, filed Jun. 8, 2020, which is hereby incorporated by reference in its entirety into this application.

BACKGROUND OF THE INVENTION

1. Technical Field

The present invention relates generally to a method and apparatus for providing security visibility into a container image, and more particularly to technology capable of analyzing software in each layer of a container image and outputting information about vulnerabilities in the software in a visual manner.

2. Description of Related Art

Unless otherwise indicated herein, the materials described in this section are not prior art with regard to the claims in this application, and are not admitted to be prior art by inclusion in this section.

Along with virtual machines, containers are widely used as infrastructure technology for cloud service.

Containers are regarded as the best technology for development and distribution of cloud-native applications because the containers have characteristics in that they are lightweight and independent and enable fast execution.

Also, with the increasing use of containers as infrastructure for applications, a container is also referred to as an "application container" these days.

A container image and a container registry are the most fundamental elements for supporting the above-described characteristics of an application container.

A container image is a bundle of files required for running a container, and everything that is necessary for executing a specific application is put into a container image in advance in order to enable the application to be executed in any environment.

A container image is built through a container image build process, and the built container image is uploaded to the container registry and downloaded therefrom when necessary.

The container image registered in the container registry through the upload is mainly used by developers or container orchestrators, and may be used as a base image for building a new container image, or may be used for automatic expansion and distributed deployment of containers.

A container registry service, such as a docker hub, provides an environment in which various official images that can be easily used as base images are managed and freely shared.

However, the use of a container image registered in the container registry may cause exposure to security threats that are similar to security threats caused when open-source code or libraries are used.

A software supply process includes a shared repository from which open-source code, libraries, and the like can be easily downloaded, and security threats related to the shared repository may arise. For example, through an attack on a shared repository, products stored therein may be tampered with, or products including malicious code may be intentionally distributed.

The Open Web Application Security Project (OWASP) recommends collecting and analyzing Software Bill-Of-Materials (SBOM) by adopting a component analysis process that can provide software transparency as a countermeasure against such a supply chain attack.

Documents of Related Art (Patent Document 1) Korean Patent Application Publication No. 10-2017-0022028, published on Mar. 2, 2017 and titled "Method and apparatus for security checking of image for container".

SUMMARY OF THE INVENTION

An object of the present invention is to secure security visibility into an opaque container image.

Another object of the present invention is to identify as much software as possible that directly or indirectly constitutes a container image.

A further object of the present invention is to provide software identification methods sorted based on the types of layers forming a container image.

Yet another object of the present invention is to check for vulnerabilities in software constituting a container image.

The technical objects of the present invention are not limited to the above technical objects, and other technical objects that are not mentioned will be readily understood from the following description.

In order to accomplish the above objects, a method for providing security visibility into a container image according to an embodiment of the present invention includes generating a software list by analyzing layers forming the container image, generating a vulnerability check result based on the software list, and generating a container image content report based on the software list and the vulnerability check result.

Here, generating the software list may include analyzing the type of the layer of the container image and generating a software list by analyzing the layer depending on the type.

Here, analyzing the type of the layer may include identifying a root file system layer including fundamental directories and utilities for running a system and identifying an alpha layer including alterations based on the root file system layer.

Here, generating the software list by analyzing the layer depending on the type may include, when the type of the layer is a root file system layer, acquiring metadata pertaining to a vanilla version of a root file system that is the same as the root file system of the container image, determining whether the root file system is in a vanilla state by comparing metadata pertaining to the root file system with the metadata pertaining to the vanilla version, and generating a software list based on the result of determining whether the root file system is in the vanilla state.

Here, determining whether the root file system is in the vanilla state may be configured to compare the metadata pertaining to the root file system with the metadata pertaining to the vanilla version, to determine the root file system to be in the vanilla state when there are no alterations, and to determine the root file system to be in a non-vanilla state when there are alterations.

Here, generating the software list based on the result of determining whether the root file system is in the vanilla state may include, when the root file system is determined to be in the vanilla state, generating a software list based on the package management file of the root file system, and when the root file system is determined to be in the non-vanilla state, extracting software names and information from modified directories and modified files corresponding to the alterations based on the metadata pertaining to the root file system, extracting packaged software list based on the package management file of the root file system, extracting an unpackaged software list by deleting redundant names included in the packaged software list from the software names extracted from the modified directories and the modified files, and generating a software list by merging the packaged software list and the unpackaged software list.

Here, generating the software list by analyzing the layer depending on the type may include, when the type of the layer is an alpha layer, acquiring information about the root file system of the container image, generating metadata pertaining to the file system of the alpha layer, extracting a first software list based on history information mapped to the alpha layer, extracting a second software list based on the package management file of the alpha layer, comparing the metadata pertaining to the file system of the alpha layer with the information about the root file system of the container image and extracting software names and information from modified directories and modified files corresponding to alterations, extracting a third software list by deleting redundant names included in the first software list and the second software list from the software names extracted from the modified directories and the modified files, and generating a software list by merging the first software list, the second software list, and the third software list.

Here, generating the vulnerability check result may include refining the software list, extracting a vulnerability list from a vulnerability database based on the refined software list, and generating the vulnerability check result based on the refined software list and the vulnerability list.

Here, refining the software list may be configured to delete software extracted from another layer or software selected by a user to be excluded from the software list.

Also, in order to accomplish the above objects, an apparatus for providing security visibility into a container image according to an embodiment of the present invention includes one or more processors and executable memory for storing at least one program executed by the one or more processors. The at least one program may generate a software list by analyzing layers forming the container image, generate a vulnerability check result based on the software list, and generate a container image content report based on the software list and the vulnerability check result.

Here, the at least one program may analyze the type of the layer of the container image and generate a software list by analyzing the layer depending on the type.

Here, the at least one program may identify a root file system layer including fundamental directories and utilities for running a system, and may identify an alpha layer including alterations based on the root file system layer.

Here, when the type of the layer is a root file system layer, the at least one program may acquire metadata pertaining to a vanilla version of a root file system that is the same as the root file system of the container image, determine whether the root file system is in a vanilla state by comparing metadata pertaining to the root file system with the metadata pertaining to the vanilla version, and generate a software list based on the result of determining whether the root file system is in the vanilla state.

Here, the at least one program may determine the root file system to be in the vanilla state if there are no alterations when the metadata pertaining to the root file system is compared with the metadata pertaining to the vanilla version, and may determine the root file system to be in a non-vanilla state if there are alterations.

Here, when the root file system is determined to be in the vanilla state, the at least one program may generate a software list based on the package management file of the root file system, and when the root file system is determined to be in the non-vanilla state, the at least one program may extract software names and information from modified directories and modified files corresponding to the alterations based on the metadata pertaining to the root file system, extract a packaged software list based on the package management file of the root file system, extract an unpackaged software list by deleting redundant names included in the packaged software list from the software names extracted from the modified directories and the modified files, and generate a software list by merging the packaged software list and the unpackaged software list.

Here, when the type of the layer is an alpha layer, the at least one program may acquire information about the root file system of the container image, generate metadata pertaining to the file system of the alpha layer, extract a first software list based on history information mapped to the alpha layer, extract a second software list based on the package management file of the alpha layer, extract software names and information from modified directories and modified files corresponding to alterations by comparing the metadata pertaining to the file system of the alpha layer with the information about the root file system of the container image, extract a third software list by deleting redundant names included in the first software list and the second software list from the software names extracted from the modified directories and modified files, and generate a software list by merging the first software list, the second software list, and the third software list.

Here, the at least one program may refine the software list, extract a vulnerability list from a vulnerability database based on the refined software list, and generate the vulnerability check result based on the refined software list and the vulnerability list.

Here, the at least one program may refine the software list by deleting software extracted from another layer or software selected by a user to be excluded from the software list.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

Figure 1:
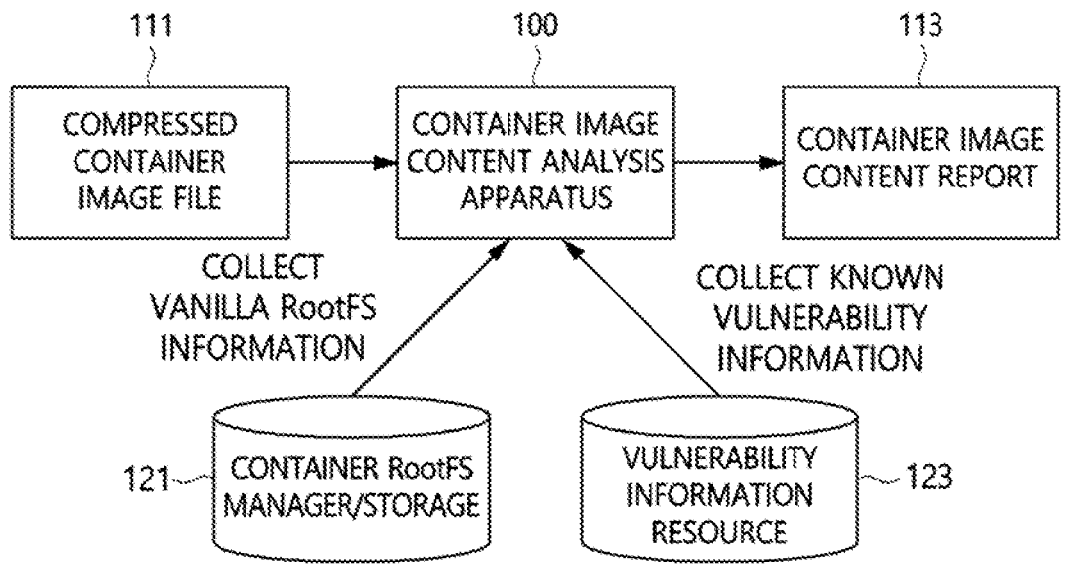
FIG. 1 is a diagram illustrating a method and apparatus for providing security visibility into container images.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Container images are easily shared and used, but it is difficult to know the actual content thereof. Therefore, container images may be carelessly propagated by container orchestrators or developers.

As a real case caused due to the above-described problem, a crypto-mining attack on a cloud server running docker and Kubernetes instances was reported in 2018. A container image hiding crypto-mining malware therein was shared through a docker hub, and it is analyzed that the corresponding malicious image was downloaded more than five millions times.

As a countermeasure against such security threats, the National Institute of Standards and Technology (NIST) recommends inspection of a container image using vulnerability management tools or processes specialized in containers before execution of the container image in the operating environment.

Security solution providers, such as Anchore, Aqua Security, Snyk, Veracode, and the like, and container platform providers, such as Google, Red Hat, and the like, strongly emphasize the need to inspect container images and secure visibility into container images for security, and provide tools and services as security solutions.

NIST presents requisites for effective tools, and the requisites include visibility of vulnerabilities in all layers of a container image (a base layer of the image, an application framework, and custom software).

However, currently available container image scanning tools and services satisfy only some of the requisites.

Most container image scanning tools or services check for known vulnerabilities. Here, identification of software required for checking for vulnerabilities is dependent on a package manager.

The package manager, which is a tool that is commonly used for installing an operating system, programming language libraries, and the like, is able to manage complicated software dependencies.

The above method using the package manager has a problem in which, because only software present in a package management list is identified as the software to be checked, the result of checking for known vulnerabilities is limited to known vulnerabilities in the corresponding software.

Meanwhile, web applications running as containers use various frameworks, and these frameworks may be installed by downloading and decompressing binaries in the container image.

Here, if these various installation methods are not considered, software that needs to be checked may not be identified, which may result in omission from a vulnerability check result.

If it is possible to analyze the components of a container image in detail and to identify the content thereof by identifying the characteristics of the container image, the accuracy of a vulnerability check result may be improved, whereby the security of the container image and the environment for running the container image may be improved.

Hereinafter, a preferred embodiment of the present invention will be described in detail with reference to the accompanying drawings.

Hereinafter, the apparatus for analyzing container image content according to an embodiment of the present invention may be the same apparatus as the apparatus for providing security visibility into a container image, and may operate in the same manner as the method for providing security visibility into a container image.

FIG. 1 is a diagram illustrating a method and apparatus for providing security visibility into container images.

Referring to FIG. 1, the apparatus 100 for analyzing container image content according to an embodiment of the present invention may receive a container image 111, and may finally provide a report 113 on container image content, which is acquired through interaction between the internal modules thereof.

Also, the apparatus 100 for analyzing container image content according to an embodiment of the present invention may collect and analyze data stored in an external container-RootFS manager/storage 121 and vulnerability information resources 123 in order to perform image component analysis and vulnerability information management.

Here, the external container-RootFS manager/storage 121 collects and stores the root file system data of containers, such as Ubuntu, Alpine, Debian, and the like, and may provide vanilla root file system information to the apparatus 100 for analyzing container image content according to an embodiment of the present invention.

Here, the vulnerability information resources 123 relate to information about known vulnerabilities acquired from the Security Feeds and National Vulnerability Database (NVD), and may be collected by the apparatus 100 for analyzing container image content according to an embodiment of the present invention.

Here, through the apparatus 100 for analyzing container image content according to an embodiment of the present invention, the capability to identify container image content and a vulnerability information management method may be improved, whereby the security of the environment in which the container is run may be strengthened.

Here, the container image content report 113 relates to a Software Bill-Of-Materials (SBOM), and may include a vulnerability check result.

Figure 2:
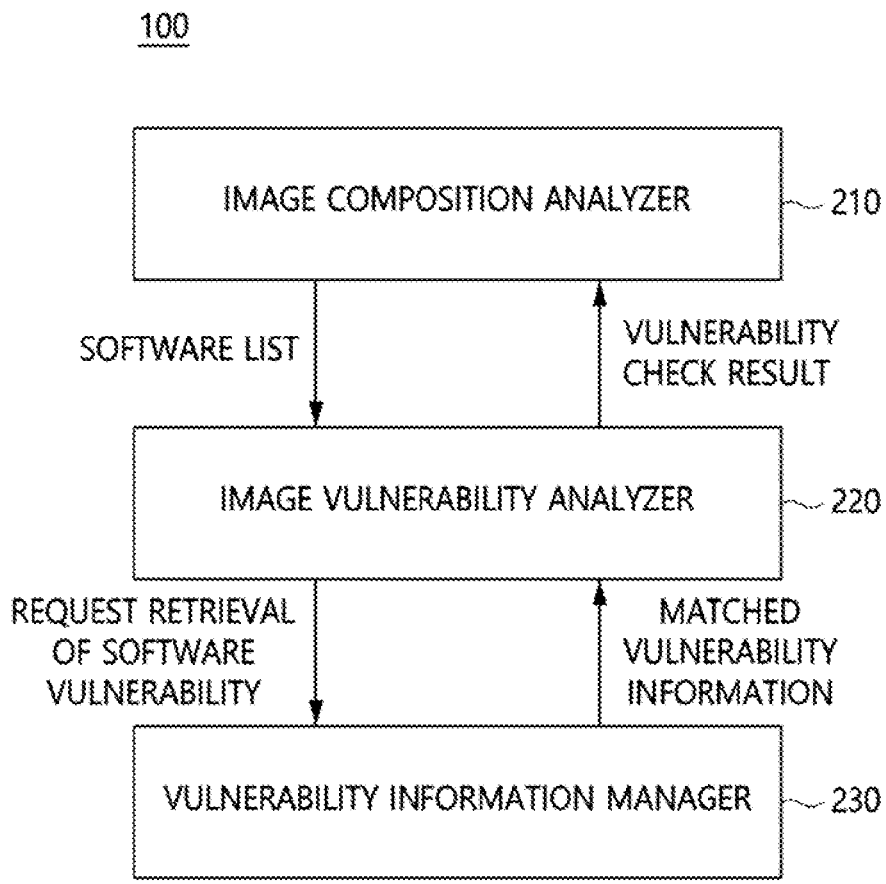
FIG. 2 is a block diagram of an apparatus for analyzing container image content according to an embodiment of the present invention.

FIG. 2 is a block diagram of an apparatus 100 for analyzing container image content according to an embodiment of the present invention.

Referring to FIG. 2, the apparatus 100 for analyzing container image content according to an embodiment of the present invention may include an image component analyzer 210, an image vulnerability analyzer 220, and a vulnerability information manager 230.

Here, the image component analyzer 210 may identify a list of software included in a container image and transmit the same to the image vulnerability analyzer 220, and may generate a container image content report by receiving a vulnerability check result from the image vulnerability analyzer 220.

Here, the image vulnerability analyzer 220 may receive the software list from the image component analyzer 210 and request the vulnerability information manager 230 to retrieve vulnerabilities of the software. Then, the image vulnerability analyzer 220 may generate a vulnerability check result by receiving vulnerability information matched with the software from the vulnerability information manager 230, and may transmit the vulnerability check result to the image component analyzer 210.

Here, the vulnerability information manager 230 may collect information about software vulnerabilities and the like from an external database and manage the same, may match vulnerabilities corresponding to software in the software list received from the image vulnerability analyzer 220 with the software list, and may transmit information about the matched vulnerabilities to the image vulnerability analyzer 220.

A detailed description thereof will be made later with reference to FIGS. 6 to 8.

Figure 3:
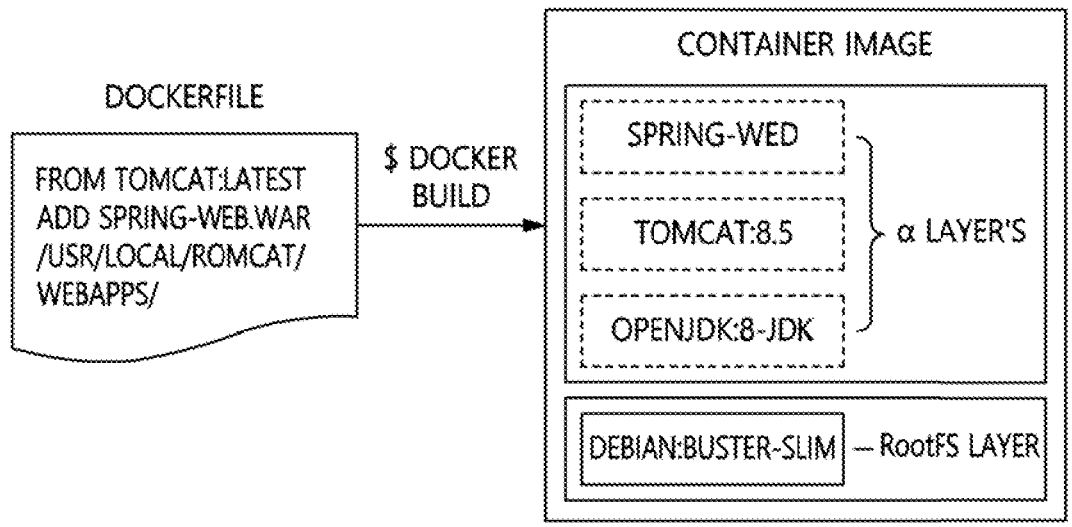
FIG. 3 is an exemplary view of a built application container image.

FIG. 3 is an exemplary view of an application container image that is built.

Referring to FIG. 3, a container image is the input of the present invention, and may be a bundle of files and environment configuration values that are required for running a container.

Here, the container image may be generated through a build process using a container engine.

For example, a docker, which is the most well-known container engine, first prepares a build file called a 'Dockerfile' for the container image build in the container image build process.

Here, the Dockerfile contains content that is necessary in order to build and run an image. The content of the Dockerfile is illustrated on the left side of FIG. 3, and the container image built using the Dockerfile is illustrated on the right side of FIG. 3.

Here, use of a Dockerfile is a method commonly used by developers in order to generate a container image required for releasing a spring-(java-)based web application as a container.

Here, the Dockerfile contains a command for importing the tomcat:latest image from a docker hub, which is a public repository for container images, and copying the spring-web.war file into/usr/local/tomcat/webapps/at build time.

Here, observing the container image, which is the build output, it is confirmed that software that is not specified in the Dockerfile is also included in the container image.

Here, the reason why software that is not specified in the Dockerfile is included in the container image is related to the build dependencies of the tomcat:latest image, which is imported at build time, and may be understood by analyzing the Dockerfile of the tomcat:latest image, which is disclosed in the docker hub.

Analyzing the disclosed Dockerfile of the tomcat:latest image, it is confirmed that the tomcat:latest image is built based on the openjdk:8-jdk image and the openjdk:8-jdk image is built based on the debian:buster-slim image. Therefore, it may be inferred that the relevant software is added as components of the container image.

As described above, it is difficult to identify the content of a container image or a container without detailed analysis thereof, which makes it more difficult to ensure security.

Figure 4:
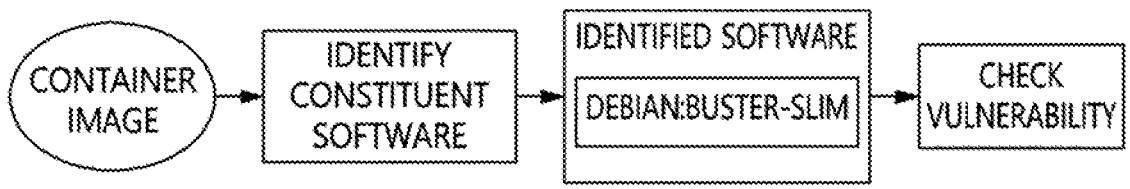
FIG. 4 is a flowchart illustrating the conventional process of checking for container image vulnerabilities.
Figure 5:
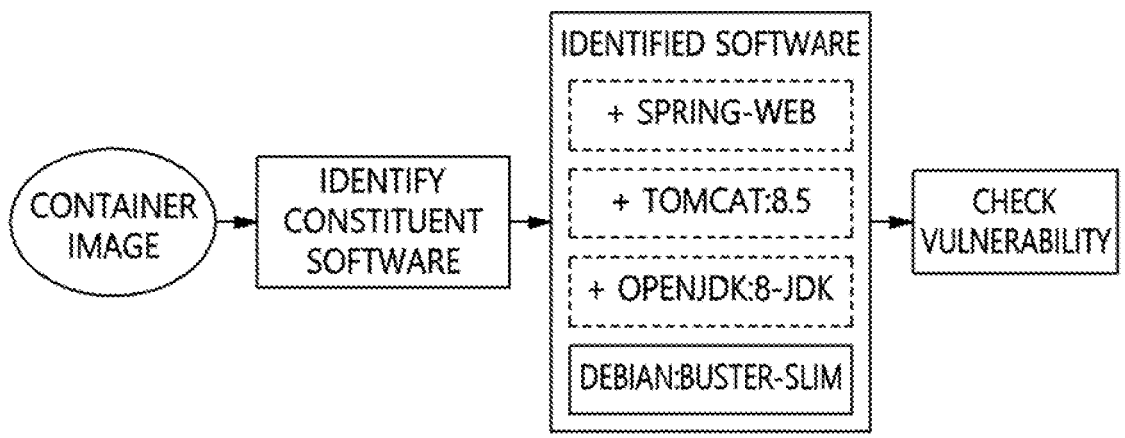
FIG. 5 is a flowchart illustrating the process of checking for container image vulnerabilities according to an embodiment of the present invention.

FIG. 4 is a flowchart illustrating a conventional process of checking for container image vulnerabilities, and FIG. 5 is a flowchart illustrating the process of checking for container image vulnerabilities according to an embodiment of the present invention.

Referring to FIG. 4, the conventional process of checking for container image vulnerabilities includes identifying software installed or included in a container image and checking whether known vulnerabilities are present in the identified software.

To this end, the conventional vulnerability scanning tools have a function to identify software installed or included in a container image and a function to collect and manage known vulnerabilities.

These functions to identify software and collect and manage vulnerabilities may also be applied in the present invention.

Here, the process of checking for container image vulnerabilities according to an embodiment of the present invention proposes a new analysis method for identifying software installed or included in a container image, thereby intending to solve the problem in which vulnerabilities are omitted from a vulnerability check result and a problem caused due to the use of an opaque container image.

Referring to FIG. 5, the process of checking for container image vulnerabilities according to an embodiment of the present invention is configured to identify the types of layers forming a container image and apply a software identification method suitable for the layer type, whereby not only packaged software but also unpackaged software may be extracted as the software to be checked for vulnerabilities.

The conventional process of checking for container image vulnerabilities, illustrated in FIG. 4, is configured to check for vulnerabilities only in the Debian operating system and components included therein. However, the process of checking for container image vulnerabilities according to an embodiment of the present invention, illustrated in FIG. 5, is configured to identify not only the operating system but also frameworks, such as openjdk and tomcat, and application components, such as spring-web, which are not installed through a package manager, and is configured to expand the checking range such that the identified unpackaged software is also examined, thereby improving the accuracy of the checking result.

As described above with reference to FIG. 2, the apparatus for analyzing container image content according to an embodiment of the present invention may include an image component analyzer, an image vulnerability analyzer, and a vulnerability information manager.

Here, the image component analyzer may serve to identify constituent content in a container image and to generate a report, the image vulnerability analyzer may serve to request retrieval of vulnerabilities and to generate a check result, and the vulnerability information manager may serve to manage vulnerability information and to reply to the request for retrieval of vulnerabilities.

Figure 6:
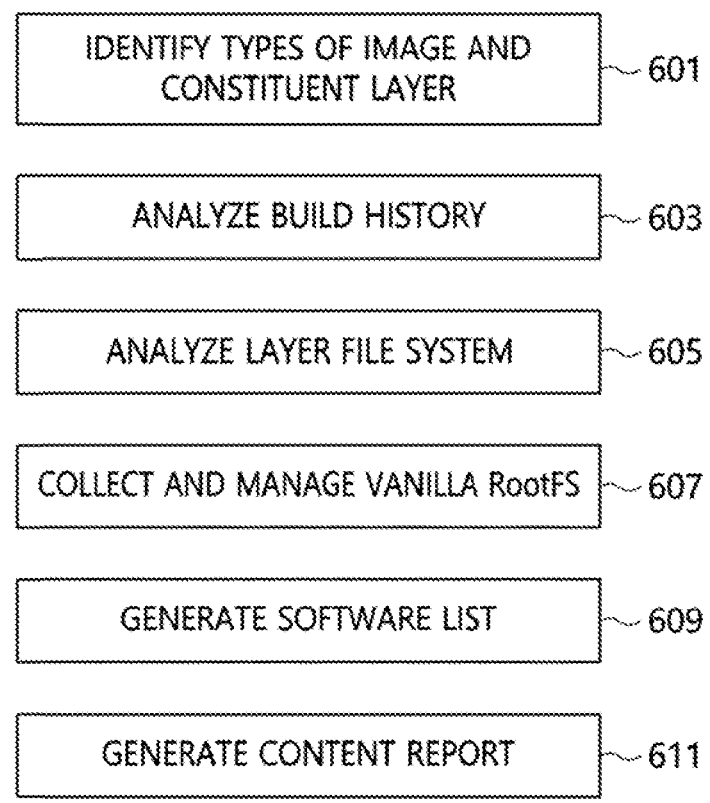
FIG. 6 is a module block diagram of an image component analyzer according to an embodiment of the present invention.

FIG. 6 is a module block diagram of an image component analyzer 210 according to an embodiment of the present invention.

Referring to FIG. 6, the functions of the image component analyzer 210 may include the function of identifying the types of an image and constituent layers (601), the function of analyzing a build history (603), the function of analyzing a layer file system (605), the function of collecting and managing a vanilla RootFS (607), the function of generating a software list (609), and the function of generating a content report (611).

According to the standard image specification set forth in the Open Container Initiative (OCI) project, which discusses standards related to containers, a container image includes one or more layers and metadata for describing the layers.

Here, the metadata includes information about the image and the constituent layers, and the respective layers in the form of compressed files are file systems and include directories and files.

Here, the image component analyzer 210 may analyze the file systems of the layers in detail (605) and generate a software list (609) in order to generate a container image content report including a vulnerability check result.

Here, the image component analyzer 210 may identify the types of a container image and constituent layers thereof (601) in order to acquire information about the container image and to decide on a method for analyzing the file systems of the layers.

The function of analyzing a build history (603) and the function of collecting and managing a vanilla RootFS (607) may be functions for acquiring reference data when a software list is extracted from the file system of the layer.

Here, the build history is information included in the metadata pertaining to a standard container image, and may correspond to the Dockerfile that was used when the image was built.

Also, because the base of layer creation and some of the methods or configured environment variables that were used in order to install or configure software in the container image can be identified from the build history, the build history may be used when information about the software installed or included in the container image is extracted.

The container image of an official Linux distribution, such as Ubuntu, Debian, CentOS, or Alpine, which is downloadable through a docker hub, includes a single layer, and the layer corresponding to a root file system is called a "root file system (RootFS) layer".

The container image is generally created based on a root file system provided on the official website of each Linux distribution, and the root file system includes a basic directory structure of a standard Linux file system and content that is similar across Linux distributions.

Therefore, when the root file system of a Linux distribution that is the same as the root file system (RootFS) layer is referred to, basic configuration information may be predicted. In order to use this characteristic for analysis, the state in which the initial root file system provided on the official website of each Linux distribution is not customized may be defined as a 'vanilla' state.

The function of collecting and managing a vanilla RootFS (607) is configured to continuously collect a root file system provided on the official website of each Linux distribution and to store and manage metadata pertaining to the collected file system as a vanilla state having no alterations.

Here, the stored metadata may be compared with the root file system (RootFS) layer of the container image to be analyzed in order to determine whether the root file system (RootFS) layer corresponds to a vanilla state or a non-vanilla state, and may be referred to when a software list is extracted.

Figure 7:
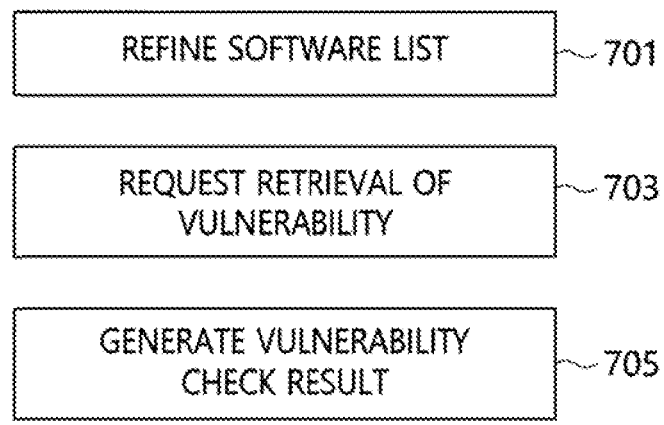
FIG. 7 is a module block diagram of an image vulnerability analyzer according to an embodiment of the present invention.

FIG. 7 is a module block diagram of an image vulnerability analyzer according to an embodiment of the present invention.

Referring to FIG. 7, the image vulnerability analyzer 220 may create and modify data that is necessary for the interaction between the image component analyzer and the vulnerability information manager, and may include the function of refining a software list (701), the function of requesting retrieval of known vulnerabilities (703), and the function of generating a vulnerability check result (705).

Here, the software list extracted by the image component analyzer causes an increase in the number of targets to be checked, thereby affecting the checking speed.

Therefore, the image vulnerability analyzer 220 may provide the function of refining the software list to be transmitted (701) before requesting retrieval of vulnerability information.

For example, the function of refining the software list (701) excludes the software list extracted from the already checked layer or provides options for adjusting the level of vulnerability analysis, thereby refining the software list.

Here, the function of requesting retrieval of vulnerabilities (703) is for invoking the vulnerability information manager, and is configured to select one of the following two request methods depending on desired information and to transmit necessary data.

The two request methods may include a method of transmitting the name of the software in order to receive vulnerability information matched with the software and a method of transmitting the unique identifier of a vulnerability (CVE ID) in order to receive software information matched with the vulnerability.

Here, when there is a large amount of information to be retrieved, data may be changed into a form acceptable by the vulnerability information manager before being transmitted.

Here, the function of generating a vulnerability check result (705) may be configured to convert the response to the retrieval request into a format for transmission to the image component analyzer.

Figure 8:
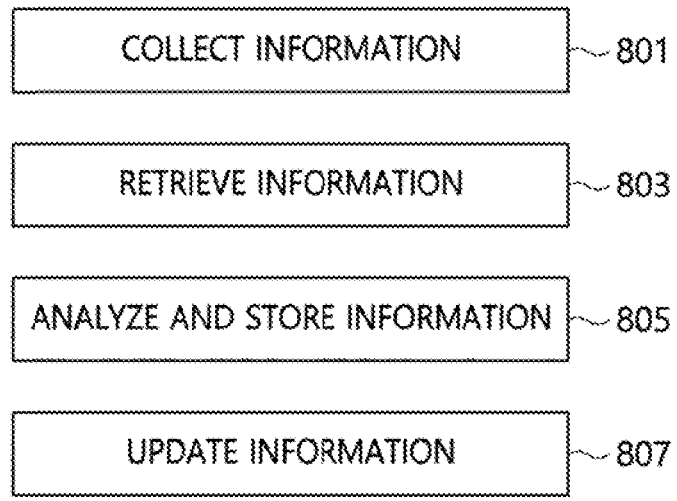
FIG. 8 is a module block diagram of a vulnerability information manager according to an embodiment of the present invention.

FIG. 8 is a module block diagram of a vulnerability information manager according to an embodiment of the present invention.

Referring to FIG. 8, the functions of the vulnerability information manager 230 may include collecting known vulnerability information (801), retrieval (803), analysis and storage (805), and update (807).

Here, the most fundamental functions of the vulnerability information manager 230 are to collect known vulnerability information from various sources (801) and to continuously update the same (807).

Here, the sources of known vulnerability information may be identified based on the unique identifiers of vulnerabilities (CVE IDs) disclosed in a Common Vulnerability Enumeration (CVE), excluding the case in which the sources are managed by vendors (Red Hat Security Advisory (RHSA), Ubuntu Security Note (USN), and the like).

Publicly disclosed vulnerabilities may be retrieved (803) from the CVE website and the NVD website, and NVD provides more detailed information.

Here, the vulnerability information manager 230 may collect known vulnerability information (801) from the two types of sources, which are vulnerability data feeds managed for respective Linux distributions, and an NVD data feed, which provides the largest database of vulnerability data.

Data from the vulnerability data feeds is collected in order to check for vulnerabilities in the package that is installed along with conventional systems, and data from the data feed of the NVD is collected in order to check for vulnerabilities in various types of software installed using a method other than the method using a package manager, according to an embodiment of the present invention.

Here, the vulnerability information manager 230 may analyze the collected NVD data in detail and store the same (805) in order to improve retrieval accuracy and speed.

Here, the vulnerability information manager 230 may identify fields containing information about vulnerable software from the NVD data, and may apply different analysis and storage methods depending on the values of these fields.

Here, the "affects" field or the "configurations" field may be basically referred to in order to identify information about software affected by vulnerabilities, and these fields may or may not contain values.

When the fields contain values, this indicates that software registered according to Common Platform Enumeration (CPE), which is the NIST's naming scheme for software and packages, is present, whereas when the fields do not contain values, this indicates that there is no software registered according to CPE.

Here, it is necessary to identify and analyze fields from which the names of the software, other than the registered name, can be identified.

For example, the NVD data includes a "description" field, and the value thereof may be a description of a vulnerability, which is written by the user who registers the vulnerability.

The "description" field may include various types of information, such as the name and version of vulnerable software, the name of software on which the vulnerable software is dependent, and the like.

Here, the value of this field may be a sentence written in English.

Therefore, a method in which words supposed to be a software name are extracted from the value of the field through syntax analysis and are then stored as keywords may be applied.

Here, the information retrieval function 803 may be configured to analyze a retrieval request received from the image vulnerability analyzer, to create an optimum query, and to return a result.

Here, the information retrieval function 803 is configured to first extract keywords to be searched for from the data received when a retrieval request is received. When the received data is a software list, the name of software, the version thereof, the name of software corresponding to dependencies thereof, and the like may be extracted as keywords.

Here, in the information retrieval function 803, the feed to be searched, the extent to which data matches a keyword, retrieval of a single entry or multiple entries, the output of the retrieval, and the like may be considered in order to create a query.

For example, when a request is made to retrieve a single software name, a query may be created in order to acquire a response with multiple CVE IDs matching the software name. When a request is made to retrieve a single CVE ID, a query may be created in order to acquire a response with multiple software names matching the CVE ID.

Figure 9:
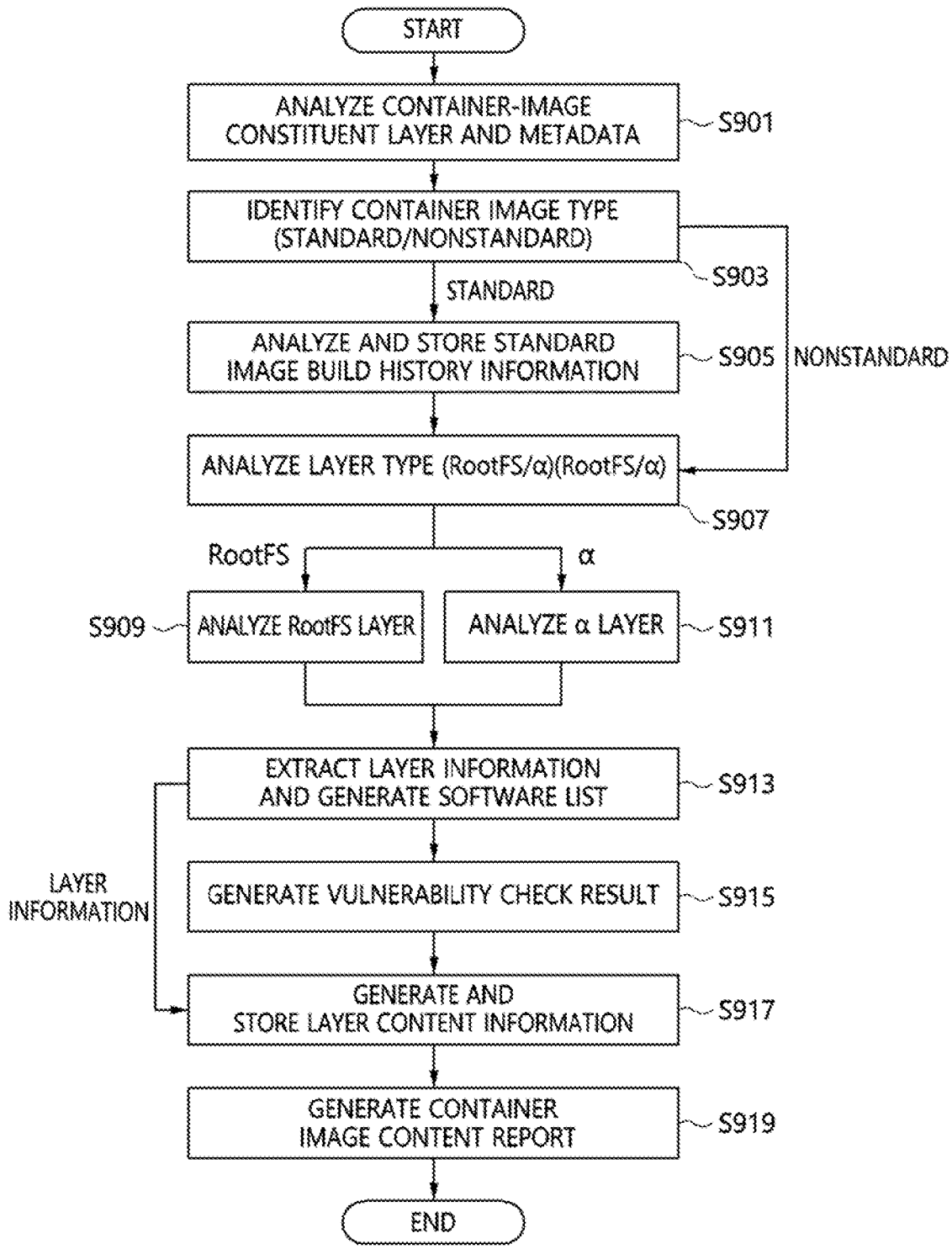
FIG. 9 is a flowchart for an apparatus for analyzing container image content according to an embodiment of the present invention.

FIG. 9 is a flowchart for an apparatus for analyzing container image content according to an embodiment of the present invention.

Referring to FIG. 9, when it receives a container image, the apparatus for analyzing container image content according to an embodiment of the present invention may perform analysis for identifying the content of the container image in phases using the image component analyzer, and may generate a vulnerability check result and a container image content report by invoking the image vulnerability analyzer and the vulnerability information manager.

More specifically, the apparatus for analyzing container image content according to an embodiment of the present invention may first decompress the container image and analyze constituent layers and metadata at step S901.

Also, the apparatus for analyzing container image content according to an embodiment of the present invention identifies the type of the container image based on the analyzed information. Here, based on the standard image specification of OCI described above, the container image may be determined to be of a standard image type at step S903 when a standard metadata file is present, or may be determined to be of a nonstandard image type at step S903 when no standard metadata file is present.

Here, when the type of the container image is a nonstandard image type, the apparatus for analyzing container image content according to an embodiment of the present invention may analyze the types of the layers, which is the next step, at step S907.

Here, when the type of the container image is a standard image type, the apparatus for analyzing container image content according to an embodiment of the present invention may extract build history information from the metadata and detect the subject and object of the layers by analyzing the extracted information at step S905.

Here, at step S905, when an ENV command line is present in the build history information, all of strings referencing the name defined in the ENV command line may be replaced with the text assigned to the name, and a command line that is the subject of layer generation may be mapped and stored.

The types of the layers may be determined by analyzing layer generation information, the hierarchical structure of the layers, and the file systems of the layers, and may be determined to be a root file system (RootFS) layer or an alpha (α) layer at step S907.

Here, the root file system layer indicates a root file system including fundamental directories and utilities that are necessary for running a system, and the alpha layer indicates a file system including alterations, made through events such as addition, modification, deletion, and the like, based on the root file system.

Here, the method for determining whether the layer is a root file system layer may differ depending on the identified image type. When the container image is of a standard image type, the layer may be determined to be a root file system layer when only a single layer is present or when the layer is the lowest layer among multiple layers (that is, when the layer has no parent). When the container image is of a non-standard image type, whether the layer is a root file system layer may be determined by checking whether the minimum set of directories, a basic set of utilities and the like are present in the file system of the corresponding layer.

Also, the apparatus for analyzing container image content according to an embodiment of the present invention extracts layer information and generates a software list at step S913 by applying a root file system layer analysis method at step S909 when the identified layer type is a root file system layer and by applying an alpha layer analysis method at step S911 when the identified layer type is an alpha layer. Then, the apparatus for analyzing container image content according to an embodiment of the present invention may generate a vulnerability check result at step S915 based on the extracted layer information and the generated software list.

Here, step S915 may be performed using a method in which the layer information and the software list are transmitted to the above-described image vulnerability analyzer through the image component analyzer and the vulnerability check result is received therefrom.

The method of performing step S915 will be described in detail later with reference to FIG. 10.

Also, the analysis method based on each layer type (S907) is performed by making use of the characteristics of each layer and the file system thereof, and this method will be described in detail later with reference to FIG. 11 and FIG. 12.

Also, the apparatus for analyzing container image content according to an embodiment of the present invention combines the layer information analyzed thereby with the vulnerability check result, thereby generating layer content information and storing the same at step S917.

Here, the apparatus for analyzing container image content according to an embodiment of the present invention may repeatedly perform the above-described steps S907 to S917. When generation and storage of the layer content information are completed for all of the layers, the apparatus for analyzing container image content according to an embodiment of the present invention may generate a container image content report based thereon, and may terminate at step S919.

Figure 10:
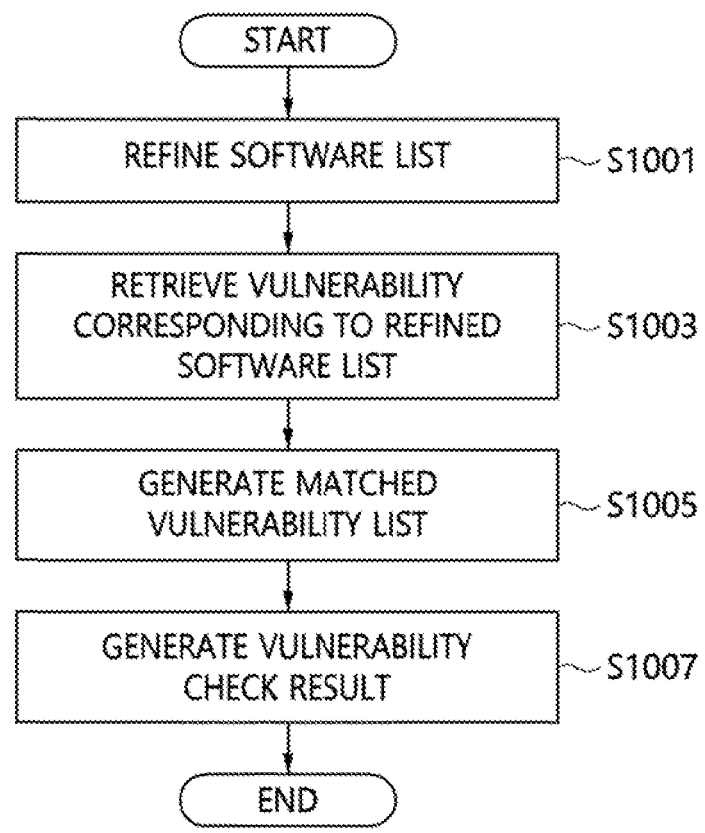
FIG. 10 is a flowchart of the process of generating a vulnerability check result according to an embodiment of the present invention.

FIG. 10 is a flowchart of the process of generating a vulnerability check result according to an embodiment of the present invention.

Referring to FIG. 10, in the process of generating the vulnerability check result at step S915, a software list may be refined at step S1001 in order to generate the final set of software to be checked for vulnerabilities.

Also, in the process of generating the vulnerability check result at step S915, vulnerabilities corresponding to software included in the refined software list may be retrieved at step S1003.

Also, in the process of generating the vulnerability check result at step S915, a vulnerability list corresponding to the software list may be generated at step S1005.

Also, in the process of generating the vulnerability check result at step S915, the vulnerability check result may be generated based on the vulnerability list corresponding to the software list at step S1007.

Also, the process of generating the vulnerability check result at step S915 may be performed using the image component analyzer, the image vulnerability analyzer, and the vulnerability information manager, which are described above.

Here, the image vulnerability analyzer may start vulnerability checking by being invoked by the image component analyzer, and may refine the received software list in order to generate the final set of software to be checked for vulnerabilities.

Here, the image vulnerability analyzer may transmit the refined software list to the vulnerability information manager and wait for a reply.

Here, the vulnerability information manager may start retrieval of vulnerability information by being invoked by the image vulnerability analyzer, and may retrieve the received refined software list from the known vulnerability information managed thereby.

Here, when a vulnerability list is acquired as the retrieval result, the vulnerability information manager may return the vulnerability list matched with the refined software list to the image vulnerability analyzer, and may terminate.

Here, the image vulnerability analyzer may generate a vulnerability check result based on the returned vulnerability list, and may return the vulnerability check result to the image component analyzer.

Figure 11:
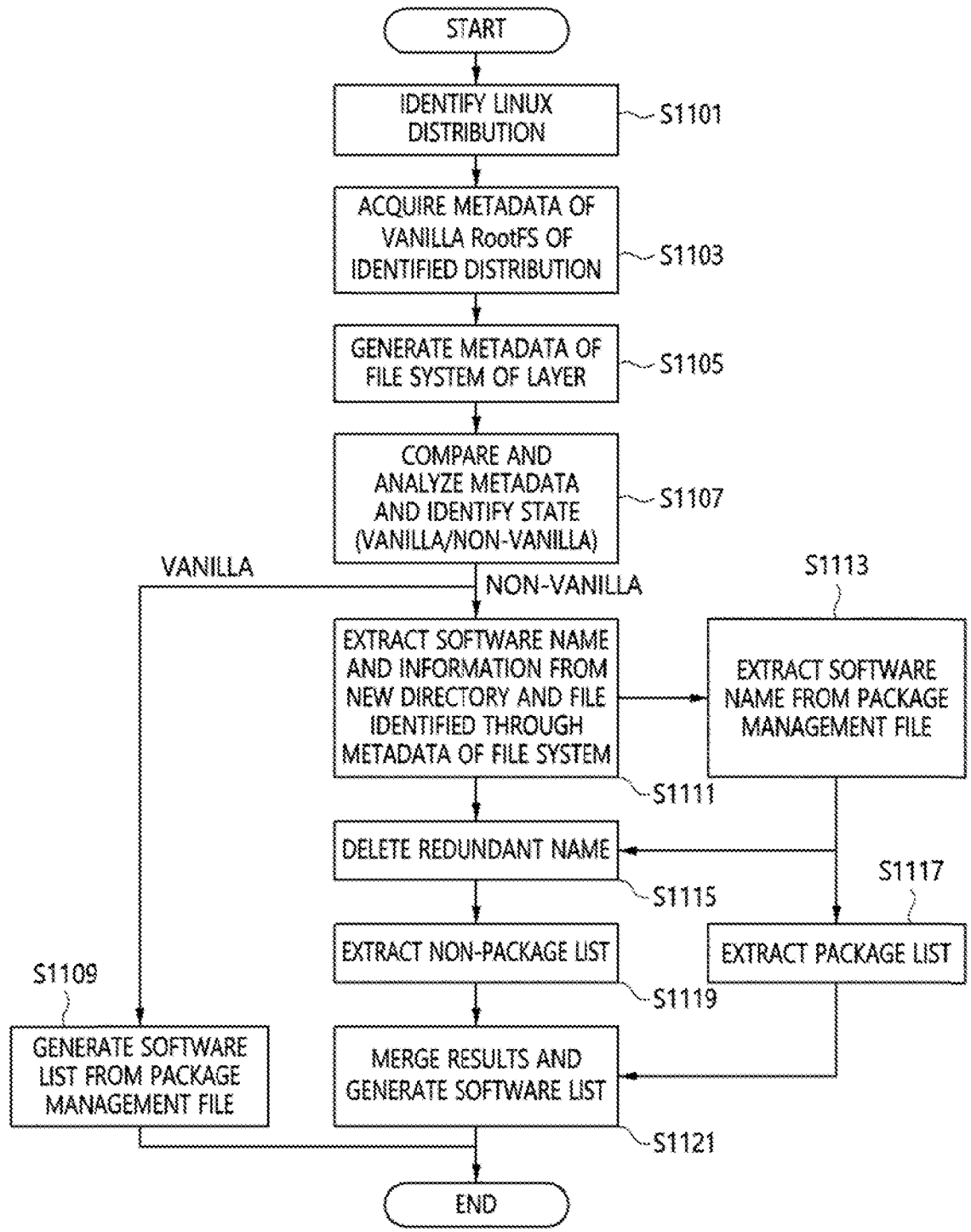
FIG. 11 is a flowchart of the process of analyzing a root file system (RootFS) layer according to an embodiment of the present invention.

FIG. 11 is a flowchart of the process of analyzing a root file system (RootFS) layer according to an embodiment of the present invention.

FIG. 11 relates to the process of analyzing the root file system layer at step S909 in FIG. 9. In the process of analyzing the root file system layer at step S909, when a layer is identified as a root file system layer through layer type analysis, the file system thereof may be analyzed by reflecting the characteristics of the root file system of a container image.

Here, a root file system may have the following characteristics in that 1) a file for describing a Linux distribution is present in the root file system, 2) a package management file is present in the root file system, 3) the form of the root file system that is not customized is identical to the corresponding version of the file system of a Linux distribution provided on the website thereof (for example, container images, such as amazonlinux and cflinuxfs, include only a root file system (RootFS) layer, and the root file systems thereof are based on CentOS and Ubuntu, respectively, but when software to be used in IaaS or PaaS is additionally provided, the form of the root file system becomes different from the forms of the root file systems of CentOS and Ubuntu), and 4) the root file system has no available build history information.

Therefore, in the process of analyzing the root file system layer at step S909, the compressed file of the layer is decompressed, whereby the file system may be analyzed based on the above-described characteristics.

In the process of analyzing the root file system layer at step S909, first, the name of a distribution and information about the version (including a patch version) may be identified from the file system at step S1101.

Also, in the process of analyzing the root file system layer at step S909, metadata pertaining to a vanilla RootFS, the version of which is the same as or similar to the version of the identified distribution, may be acquired from the collected and managed Vanilla RootFS at step S1103.

Also, in the process of analyzing the root file system layer at step S909, metadata pertaining to the file system of the layer may be generated at step S1105.

Here, the metadata may include a directory name, a file name, a file type, a file size, update date information, and the like.

Also, in the process of analyzing the root file system layer at step S909, the generated metadata is compared with the acquired metadata pertaining to the Vanilla RootFS, whereby the state of the root file system may be determined at step S1107.

Here, at step S1107, the state may be determined to be a vanilla state when there are no alterations to the file system, but may be determined to be a non-vanilla state when there is an alteration thereto. The above-mentioned root file system of the RootFS layer of amazonlinux or cflinuxfs may be identified as in the non-vanilla state.

Here, in the process of analyzing the root file system layer at step S909, when the file system of the layer is determined to be in a vanilla state, the name and version of software are extracted from a package management file, and a list of software to be checked may be generated at step S1109. However, when the file system of the layer is determined to be in a non-vanilla state, the difference from the vanilla state may be identified by comparing the non-vanilla state with the vanilla state.

Here, the difference may appear in two aspects. The first aspect is that the package management files are different from each other, and the second aspect is that a new directory or file is present.

Here, when the package management files are different from each other, the second aspect also appears. However, when a new directory or file is present even though the package management files are the same as each other, this indicates that software that is not managed by a package manager is installed.

In the process of analyzing the root file system layer at step S909, when the file system is determined to be in the non-vanilla state based on either of the two aspects mentioned above, the name of software and information thereabout may be extracted from a directory or file having a path that is not present in the vanilla state at step S1111.

Then, in the process of analyzing the root file system layer at step S909, software names are extracted from the package management file at step S1113, and redundant names, identified by comparing the software names extracted at the previous step with the software names extracted from the package management file, are deleted from the software names extracted in the previous step at step S1115, whereby a non-package list may be acquired at step S1119.

Also, in the process of analyzing the root file system layer at step S909, a package list may be extracted from the package management file at step S1117, and a list of software to be checked may be generated at step S1121 by merging the non-package list with the package list.

Figure 12:
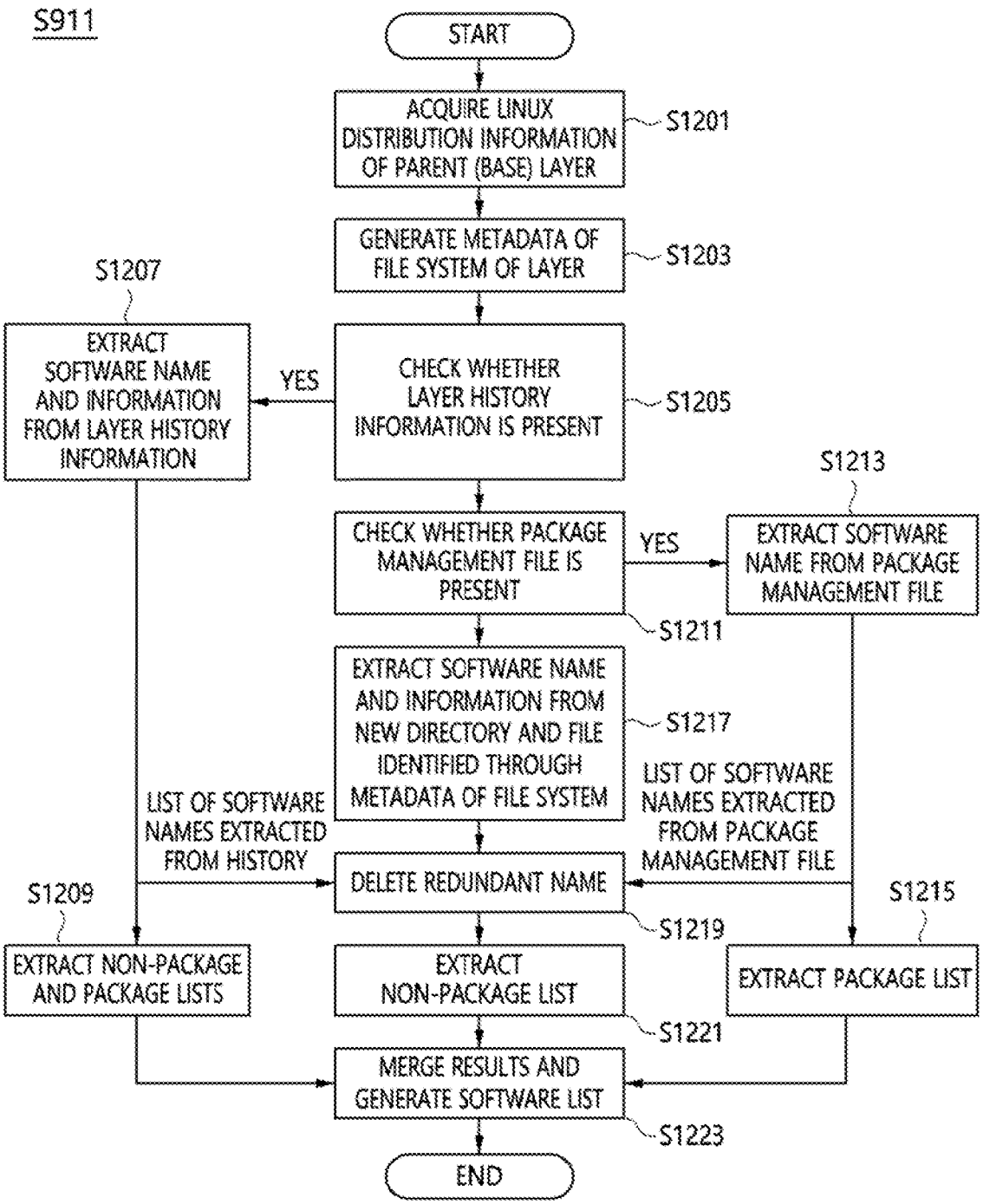
FIG. 12 is a flowchart of the process of analyzing an alpha layer according to an embodiment of the present invention.

FIG. 12 is a flowchart of the process of analyzing an alpha layer according to an embodiment of the present invention.

FIG. 12 relates to the process of analyzing the alpha layer at step S911 in FIG. 9. In the process of analyzing the alpha layer at step S911, when a layer is identified as an alpha layer through layer type analysis, the file system thereof may be analyzed by reflecting the characteristics of the alpha file system of a container image.

Here, an alpha file system may be characterized as follows in that 1) generation of the alpha file system of a standard image and the content thereof correspond to a RUN command line in a build history, 2) a package management file is present in the file system if the package is installed using a package manager, 3) no package management file is present in the file system if a package manager is not used for installation, and 4) only altered values are present in the file system of the alpha layer, but it is necessary to refer to information about a root file system layer and the parent layer thereof because the file system of the alpha layer inherits basic information about the Linux distribution and the file system of the root file system layer and the parent layer.

Therefore, in the process of analyzing the alpha layer at step S911, the compressed file of the layer is decompressed, whereby the file system thereof may be analyzed based on the above-described characteristics.

In the process of analyzing the alpha layer at step S911, first, Linux distribution information is acquired from the previously analyzed root file system layer content information at step S1201, and metadata pertaining to the file system of the layer may be generated at step S1203.

Also, in the process of analyzing the alpha layer at step S911, a history mapped to the corresponding layer is retrieved and analyzed, whereby whether history information related to software installation and configuration is present may be checked at step S1205.

Also, in the process of analyzing the alpha layer at step S911, when such history information is present, the name and version of software are extracted from the history at step S1207, and a non-package list and a package list may be extracted at step S1209.

Here, the method of extracting the name and version of software from the history may be a method that is useful when software that is installed without using a package manager is identified, and this method has high accuracy.

Here, referring to official images in a docker hub, it may be confirmed that a standardized method is mostly used when software in a binary form is configured.

Here, a process for checking the layer history information may be simply subdivided into downloading a compressed binary file from the repository that stores the software to be configured, verifying the binary, and decompressing the compressed binary file.

Here, in the process of downloading the compressed binary file, because a URL string for downloading generally includes the name and version of the software, this pattern may be used to extract the software information.

More specifically, whether a command matching the layer in the history is 'RUN' is checked, whether the following command is for invoking a URL using a wget command or a curl tool is checked, and the URL string may be searched for the pattern 'software name-version.extension of compressed file'.

Also, in the process of analyzing the alpha layer at step S911, after the layer history information is checked, whether a package management file is present may be checked at step S1211.

Here, the presence of the package management file may indicate that certain software is installed using a package manager.

Also, in the case of a layer generated by executing only a specific script file, it may be confirmed that the corresponding installation method is used in the script.

Here, in the process of analyzing the alpha layer at step S911, when a package management file is present, software names are extracted therefrom at step S1213, whereby a package list may be acquired at step S1215.

Also, in the process of analyzing the alpha layer at step S911, the name of software and information thereabout may be extracted from a new directory and file, which are identified from the metadata pertaining to the file system, at step S1217.

Also, in the process of analyzing the alpha layer at step S911, the information extracted at step S1217 is compared with the software names extracted from the layer history information and the package management file, whereby redundant names are deleted at step S1219. Accordingly, the information extracted at step S1217, from which the redundant names are deleted, may be acquired as a non-package list at step S1221.

Also, in the process of analyzing the alpha layer at step S911, the lists acquired at the respective steps are merged, whereby a list of software to be checked may be generated at step S1223.

The above-described process of extracting the names of software and information thereabout from a new directory and file, which are identified from the metadata pertaining to the file system, at steps S1111 in FIG. 11 and S1217 in FIG. 12 is one method for discovering unpackaged software, and this method uses the characteristics of changes in the file system that are caused when software is configured or installed.

For example, when software is configured or installed and a directory having the same name as the software name is created in the file system, a numerical pattern in the directory name or the file name may indicate version information.

Additionally, various changes appearing in the file system are analyzed, whereby a maximum data set of software information may be generated.

Also, in the process of deleting the redundant names at steps S1115 and S1219, the name that is identified by authenticated information such as the package management file or the layer history information is excluded, whereby the names of meaningful software may be selected from the massive data set.

The respective software lists generated through the above-described analysis method may include all of the packaged software and the unpackaged software, may be transmitted to the image vulnerability analyzer as the target to be checked for vulnerabilities, and may then be reported as the information about the content of the layer along with the checking result.

Figure 13:
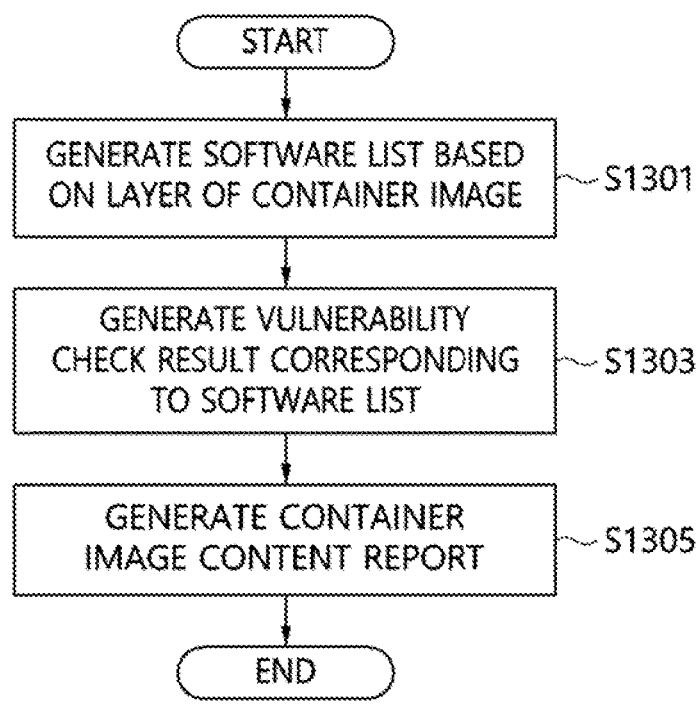
FIG. 13 is a flowchart of a method for providing security visibility into a container image according to an embodiment of the present invention.

FIG. 13 is a flowchart of a method for providing security visibility into a container image according to an embodiment of the present invention.

Referring to FIG. 13, in the method for providing security visibility into a container image through a computer device according to an embodiment of the present invention, first, the layers forming the container image are analyzed, whereby a software list is generated at step S1301.

Here, step S1301 may include analyzing the types of the layers of the container image and generating the software list by analyzing the layers depending on the types thereof.

Here, step S1301 may include identifying a root file system layer including fundamental directories and utilities for running a system and identifying an alpha layer including alterations based on the root file system layer.

Here, generating the software list by analyzing the layers depending on the types thereof may include, when the type of the layer is a root file system layer, acquiring metadata pertaining to the vanilla version of a root file system that is the same as the root file system of the container image, determining whether the root file system of the container image is in a vanilla state by comparing the metadata pertaining to the root file system with the metadata pertaining to the vanilla version, and generating the software list based on the result of the determination of whether the root file system is in the vanilla state.

Here, determining whether the root file system is in the vanilla state is configured to compare the metadata pertaining to the root file system with the metadata pertaining to the vanilla version, to determine that the root file system is in the vanilla state when there are no alterations, and to determine that the root file system is in the non-vanilla state when there is an alteration.

Here, generating the software list based on the result of the determination of whether the root file system is in the vanilla state may be configured to generate a software list based on the package management file of the root file system when the root file system is determined to be in the vanilla state, and may include, when the root file system is determined to be in the non-vanilla state, extracting software names and information from modified directories and files, corresponding to the alterations, based on the metadata pertaining to the root file system, extracting a packaged software list based on the package management file of the root file system, extracting an unpackaged software list by deleting redundant names included in the packaged software list from the software names extracted from the modified directories and files, and generating a software list by merging the packaged software list and the unpackaged software list.

Here, the modified directories and files may be newly added or changed directories and files that are identified through comparison with the metadata pertaining to the vanilla version of the container image.

Here, generating the software list by analyzing the layers depending on the types thereof may include, when the type of the layer is an alpha layer, acquiring information about the root file system of the container image, generating metadata pertaining to the file system of the alpha layer, extracting a first software list based on the history information mapped to the alpha layer, extracting a second software list based on the package management file of the alpha layer, comparing the metadata pertaining to the file system of the alpha layer with the information about the root file system of the container image and thereby extracting software names and information from modified directories and files corresponding to alterations, extracting a third software list by deleting redundant names included in the first software list and the second software list from the software names extracted from the modified directories and files, and generating a software list by merging the first software list, the second software list, and the third software list.

Also, in the method for providing security visibility into a container image according to an embodiment of the present invention, a vulnerability check result is generated based on the software list at step S1303.

Also, in the method for providing security visibility into a container image according to an embodiment of the present invention, a container image content report is generated based on the software list and the vulnerability check result at step S1305.

Here, step S1303 may include refining the software list, extracting a vulnerability list from a vulnerability database based on the refined software list, and generating the vulnerability check result based on the refined software list and the vulnerability list.

Here, refining the software list may be configured to delete software extracted from another layer or software selected by a user to be excluded from the software list.

Figure 14:
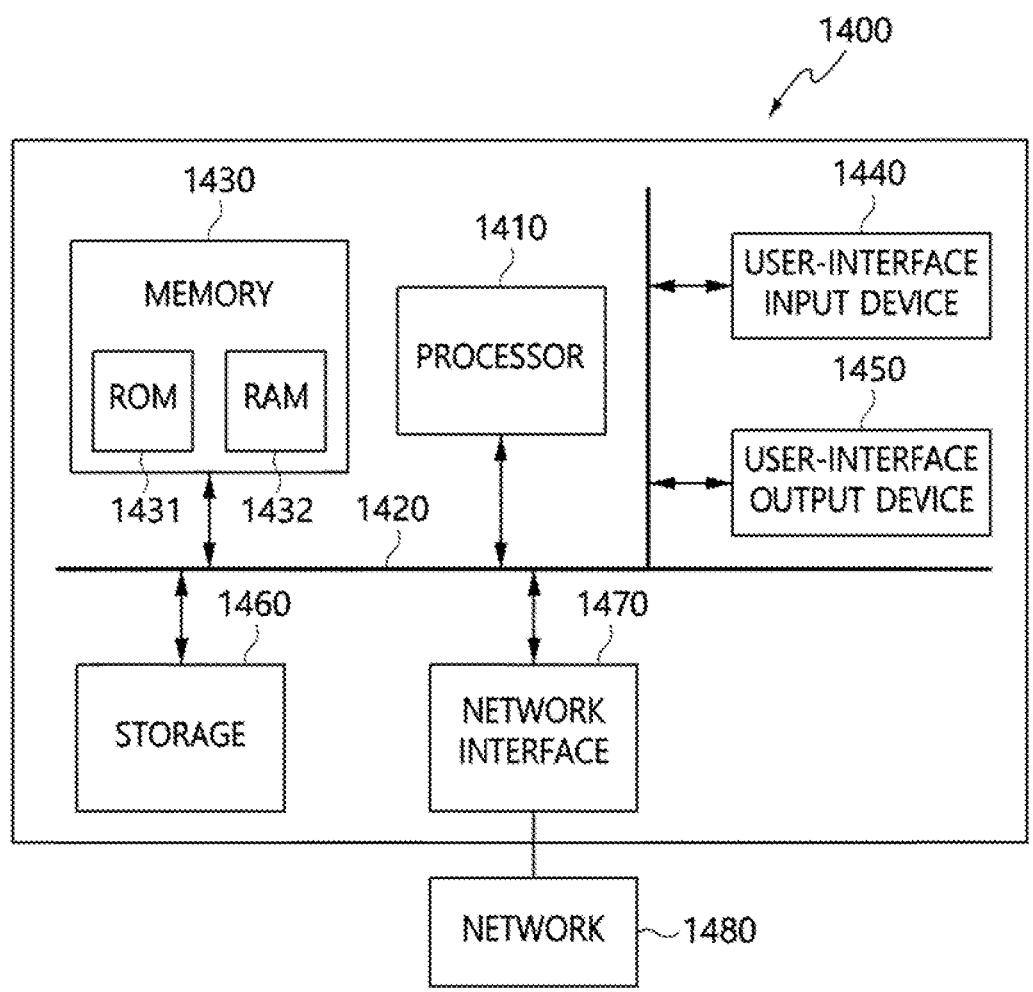
FIG. 14 is a view illustrating a computer system according to an embodiment of the present invention.

FIG. 14 is a view illustrating a computer system according to an embodiment of the present invention.

Referring to FIG. 14, an embodiment of the present invention may be implemented in a computer system including a computer-readable recording medium. As illustrated in FIG. 14, the computer system 1400 may include one or more processors 1410, memory 1430, a user-interface input device 1440, a user-interface output device 1450, and storage 1460, which communicate with each other via a bus 1420. Also, the computer system 1400 may further include a network interface 1470 connected to a network 1480. The processor 1410 may be a central processing unit or a semiconductor device for executing processing instructions stored in the memory 1430 or the storage 1460. The memory 1430 and the storage 1460 may be any of various types of volatile or nonvolatile storage media. For example, the memory may include ROM 1431 or RAM 1432.

Here, the apparatus for providing security visibility into a container image according to an embodiment of the present invention includes one or more processors and executable memory for storing at least one program executed by the one or more processors. The at least one program may generate a software list by analyzing layers forming a container image, generate a vulnerability check result based on the software list, and generate a container image content report based on the software list and the vulnerability check result.

Here, the at least one program may analyze the type of the layer of the container image and analyze the layer depending on the type thereof, thereby generating a software list.

Here, the at least one program may identify a root file system layer including fundamental directories and utilities for running a system, and may identify an alpha layer including alterations based on the root file system layer.

Here, when the type of the layer is a root file system layer, the at least one program may acquire metadata pertaining to the vanilla version of a root file system that is the same as the root file system of the container image, may determine whether the root file system is in a vanilla state by comparing the metadata pertaining to the root file system with the metadata pertaining to the vanilla version, and may generate a software list based on the result of the determination of whether the root file system is in the vanilla state.

Here, the at least one program may compare the metadata pertaining to the root file system with the metadata pertaining to the vanilla version, may determine the root file system to be in the vanilla state when there are no alterations, and may determine the root file system to be in a non-vanilla state when there is an alteration.

Here, when the root file system is determined to be in the vanilla state, the at least one program may generate a software list based on the package management file of the root file system. When the root file system is determined to be in the non-vanilla state, the at least one program may extract software names and information from modified directories and files corresponding to the alterations based on the metadata pertaining to the root file system, extract a packaged software list based on the package management file of the root file system, extract an unpackaged software list by deleting redundant names included in the packaged software list from the software names extracted from the modified directories and files, and generate a software list by merging the packaged software list and the unpackaged software list.

Here, the modified directories and files may be newly added directories and files or changed directories and files that are identified through comparison with the metadata pertaining to the vanilla version of the container image.

Here, when the type of the layer is an alpha layer, the at least one program may acquire information about the root file system of the container image, generate metadata pertaining to the file system of the alpha layer, extract a first software list based on history information mapped to the alpha layer, extract a second software list based on the package management file of the alpha layer, extract software names and information from modified directories and files corresponding to alterations by comparing the metadata pertaining to the file system of the alpha layer with the information about the root file system of the container image, extract a third software list by deleting redundant names included in the first software list and the second software list from the software names extracted from the modified directories and files, and generate a software list by merging the first software list, the second software list, and the third software list.

Here, the at least one program may refine the software list, extract a vulnerability list from a vulnerability database based on the refined software list, and generate the vulnerability check result based on the refined software list and the vulnerability list.

Here, the at least one program may refine the software list by deleting software extracted from another layer or software selected by a user to be excluded from the software list.

Accordingly, an embodiment of the present invention may be implemented as a nonvolatile computer-readable storage medium in which methods implemented using a computer or instructions executable in a computer are recorded. When the computer-readable instructions are executed by a processor, the computer-readable instructions may perform a method according to at least one aspect of the present invention.

According to the present invention, security visibility into an opaque container image may be secured.

Also, according to the present invention, as much software as possible that directly or indirectly constitutes a container image may be identified.

Also, according to the present invention, software identification methods sorted based on the types of layers forming a container image may be provided.

Also, according to the present invention, vulnerabilities in software constituting a container image may be checked.

The effects of the present embodiments are not limited to the above-mentioned effects, and other unmentioned effects will be clearly understood from the following claims by those having ordinary skill in the technical field to which the present invention pertains.

As described above, the method and apparatus for providing security visibility into a container image according to the present invention are not limitedly applied to the configurations and operations of the above-described embodiments, but all or some of the embodiments may be selectively combined and configured, so the embodiments may be modified in various ways.

What is claimed is:

1. A method for providing security visibility into a container image through a computer device, the method comprising:
generating a software list by analyzing layers forming the container image;
generating a vulnerability check result based on the software list; and
generating a container image content report based on the software list and the vulnerability check result,
wherein generating the vulnerability check result comprises:
refining the software list;
extracting a vulnerability list from a vulnerability database based on the refined software list; and
generating the vulnerability check result based on the refined software list and the vulnerability list,
wherein refining the software list is configured to delete software extracted from another layer which has been already checked for vulnerability, or software excluded by a user selection from the software list.

2. The method of claim 1,
wherein generating the software list comprises:
analyzing a type of the layer of the container image; and generating a software list by analyzing the layer depending on the type,
wherein analyzing the type of the layer comprises:
identifying a root file system layer including fundamental directories and utilities for running a system; and
identifying an alpha layer including alterations based on the root file system layer.

3. The method of claim 2, wherein generating the software list by analyzing the layer depending on the type comprises:
when the type of the layer is the root file system layer,
acquiring metadata pertaining to a vanilla version of a root file system that is a same as a root file system of the container image;
determining whether the root file system is in a vanilla state by comparing metadata pertaining to the root file system with the metadata pertaining to the vanilla version; and
generating a software list based on a result of determining whether the root file system is in the vanilla state.

4. The method of claim 3, wherein determining whether the root file system is in the vanilla state is configured to compare the metadata pertaining to the root file system with the metadata pertaining to the vanilla version, to determine the root file system to be in the vanilla state when there are no alterations, and to determine the root file system to be in a non-vanilla state when there are alterations.

5. The method of claim 4, wherein generating the software list based on the result of determining whether the root file system is in the vanilla state comprises:
when the root file system is determined to be in the vanilla state,
generating a software list based on a package management file of the root file system, and
when the root file system is determined to be in the non-vanilla state,
extracting software names and information from modified directories and modified files corresponding to the alterations based on the metadata pertaining to the root file system;
extracting a packaged software list based on the package management file of the root file system;
extracting an unpackaged software list by deleting redundant names included in the packaged software list from the software names extracted from the modified directories and the modified files; and
generating a software list by merging the packaged software list and the unpackaged software list.

6. The method of claim 2, wherein generating the software list by analyzing the layer depending on the type comprises:
when the type of the layer is the alpha layer,
acquiring information about a root file system of the container image;
generating metadata pertaining to a file system of the alpha layer;
extracting a first software list based on history information mapped to the alpha layer;
extracting a second software list based on a package management file of the alpha layer;
comparing the metadata pertaining to the file system of the alpha layer with the information about the root file system of the container image and extracting software names and information from modified directories and modified files corresponding to alterations;
extracting a third software list by deleting redundant names included in the first software list and the second software list from the software names extracted from the modified directories and the modified files; and
generating a software list by merging the first software list, the second software list, and the third software list.

7. An apparatus for providing security visibility into a container image, comprising:
one or more processors; and
executable memory for storing at least one program executed by the one or more processors,
wherein the at least one program generates a software list by analyzing layers forming the container image, generates a vulnerability check result based on the software list, and generates a container image content report based on the software list and the vulnerability check result,
wherein the at least one program refines the software list, extracts a vulnerability list from a vulnerability database based on the refined software list, and generates the vulnerability check result based on the refined software list and the vulnerability list,
wherein the at least one program refines the software list by deleting software extracted from another layer which has been already checked for vulnerability, or software excluded by a user selection from the software list.

8. The apparatus of claim 7,
wherein the at least one program analyzes a type of the layer of the container image and generates a software list by analyzing the layer depending on the type,
wherein the at least one program identifies a root file system layer including fundamental directories and utilities for running a system, and identifies an alpha layer including alterations based on the root file system layer.

9. The apparatus of claim 8, wherein, when the type of the layer is the root file system layer, the at least one program acquires metadata pertaining to a vanilla version of a root file system that is a same as a root file system of the container image, determines whether the root file system is in a vanilla state by comparing metadata pertaining to the root file system with the metadata pertaining to the vanilla version, and generates a software list based on a result of determining whether the root file system is in the vanilla state.

10. The apparatus of claim 9, wherein the at least one program determines the root file system to be in the vanilla state if there are no alterations when the metadata pertaining to the root file system is compared with the metadata pertaining to the vanilla version, and determines the root file system to be in a non-vanilla state if there are alterations.

11. The apparatus of claim 10, wherein:
when the root file system is determined to be in the vanilla state, the at least one program generates a software list based on a package management file of the root file system, and
when the root file system is determined to be in the non-vanilla state, the at least one program extracts software names and information from modified directories and modified files corresponding to the alterations based on the metadata pertaining to the root file system, extracts a packaged software list based on the package management file of the root file system, extracts an unpackaged software list by deleting redundant names included in the packaged software list from the software names extracted from the modified directories and the modified files, and generates a software list by merging the packaged software list and the unpackaged software list.

12. The apparatus of claim 8, wherein, when the type of the layer is the alpha layer, the at least one program acquires information about a root file system of the container image, generates metadata pertaining to a file system of the alpha layer, extracts a first software list based on history information mapped to the alpha layer, extracts a second software list based on a package management file of the alpha layer, extracts software names and information from modified directories and modified files corresponding to alterations by comparing the metadata pertaining to the file system of the alpha layer with the information about the root file system of the container image, extracts a third software list by deleting redundant names included in the first software list and the second software list from the software names extracted from the modified directories and modified files, and generates a software list by merging the first software list, the second software list, and the third software list.

\* \* \* \* \*